(12) United States Patent
Kruse Mortensen

(10) Patent No.: US 12,274,970 B2
(45) Date of Patent: Apr. 15, 2025

(54) SCRUBBER FOR CLEANING OF A GAS

(71) Applicant: ALFA LAVAL CORPORATE AB, Lund (SE)

(72) Inventor: Ruddi Kruse Mortensen, Nibe (DK)

(73) Assignee: ALFA LAVAL CORPORATE AB, Lund (SE)

( * ) Notice: Subject to any disclaimer, the term of this patent is extended or adjusted under 35 U.S.C. 154(b) by 410 days.

(21) Appl. No.: 16/628,600

(22) PCT Filed: Jun. 19, 2018

(86) PCT No.: PCT/EP2018/066199
§ 371 (c)(1),
(2) Date: Jan. 3, 2020

(87) PCT Pub. No.: WO2019/025071
PCT Pub. Date: Feb. 7, 2019

(65) Prior Publication Data
US 2020/0179863 A1 Jun. 11, 2020

(30) Foreign Application Priority Data
Aug. 1, 2017 (EP) ..................... 17184158

(51) Int. Cl.
B01D 47/06 (2006.01)
B01D 53/18 (2006.01)
F01N 3/04 (2006.01)

(52) U.S. Cl.
CPC ............ B01D 47/06 (2013.01); B01D 53/18 (2013.01); B01D 2257/30 (2013.01); F01N 3/04 (2013.01);
(Continued)

(58) Field of Classification Search
CPC ...... B01D 2257/30; B01D 3/26; B01D 47/06; B01D 53/18; B01D 5/003; B01D 5/0084;
(Continued)

(56) References Cited

U.S. PATENT DOCUMENTS 1,894,744 A * 1/1933 Hawley ................. B01D 47/02
55/455
2,114,786 A * 4/1938 Schneible ............... B01D 3/30
261/109
(Continued)

FOREIGN PATENT DOCUMENTS

| CN | 101678295 A | 3/2010 |
| CN | 205127610 U | 4/2016 |

(Continued)

OTHER PUBLICATIONS

Office Action (Second Office Action) issued Feb. 14, 2022, by the State Intellectual Property Office of People's Republic of China in corresponding Chinese Patent Application No. 201880050196.1 and an English Translation of the Office Action. (11 pages).

(Continued)

Primary Examiner — Stephen Hobson
(74) Attorney, Agent, or Firm — BUCHANAN INGERSOLL & ROONEY PC

(57) ABSTRACT

A scrubber for cleaning of a gas comprises a casing enclosing a scrubbing chamber. The casing comprises a gas inlet into and a gas outlet out from the scrubbing chamber. A gas flow of the gas flows through the scrubbing chamber in a flow direction from the gas inlet to the gas outlet. A deflector device is provided in the scrubbing chamber between the gas inlet and the gas outlet and forms a passage between the deflector device and the casing. A spraying nozzle is arranged between the gas outlet and the deflector device for spraying a scrubbing liquid into the scrubbing chamber and the gas flow. An inner shield extends between the casing and (Continued)

the deflector device, surrounds the deflector device at least partly, and forms a gap with the casing. Scrubbing liquid may flow through the gap.

18 Claims, 5 Drawing Sheets

(52) U.S. Cl.
CPC ...... *F01N 2570/04* (2013.01); *F01N 2590/02* (2013.01); *F23J 2219/40* (2013.01)

(58) Field of Classification Search
CPC . B01D 3/008; B01D 53/1481; F01N 2240/20; F01N 2570/04; F01N 2590/02; F01N 3/04; F23J 2219/40; Y02T 10/12
See application file for complete search history.

(56) References Cited

U.S. PATENT DOCUMENTS

| | | | | |
|---|---|---|---|---|
| 2,143,904 | A * | 1/1939 | Woodwell | B01D 3/008 261/111 |
| 2,259,033 | A * | 10/1941 | Fisher | B04C 7/00 261/21 |
| 2,409,088 | A * | 10/1946 | Weits | B01D 47/06 261/111 |
| 2,428,922 | A * | 10/1947 | Shoresman | B01J 8/0492 261/95 |
| 2,587,416 | A * | 2/1952 | Vedder | B01D 47/00 261/21 |
| 2,596,104 | A * | 5/1952 | Schneible | B01D 47/00 261/109 |
| 2,611,685 | A * | 9/1952 | Yoder | B01J 8/44 34/582 |
| 2,639,947 | A * | 5/1953 | Schaub | B01D 3/008 261/111 |
| 2,810,450 | A * | 10/1957 | Hartmann | B01D 47/06 261/36.1 |
| 2,972,393 | A * | 2/1961 | Bush | C10K 1/06 95/290 |
| 3,006,623 | A * | 10/1961 | James | B01D 3/008 422/255 |
| 3,131,237 | A * | 4/1964 | Collins, Jr. | B01D 47/10 261/126 |
| 3,243,171 | A * | 3/1966 | Eckert | B01D 53/18 261/97 |
| 3,290,025 | A * | 12/1966 | Engalitcheff, Jr. | B01D 3/008 261/DIG. 11 |
| 3,327,455 | A * | 6/1967 | Wertheimer | B01D 53/34 261/115 |
| 3,336,733 | A * | 8/1967 | Wisting | B01D 47/06 261/DIG. 54 |
| 3,363,843 | A * | 1/1968 | Ballard | B01D 3/008 261/97 |
| 3,408,055 | A * | 10/1968 | Andre | B01F 23/2132 261/98 |
| 3,456,928 | A * | 7/1969 | Selway | B01D 47/06 422/171 |
| 3,497,194 | A * | 2/1970 | Hans | C21C 5/40 261/126 |
| 3,708,958 | A * | 1/1973 | Duty | B01D 53/1493 261/117 |
| 3,779,525 | A * | 12/1973 | Tanigawa | B01D 3/26 261/114.1 |
| 4,231,765 | A * | 11/1980 | Scott | B01D 53/34 134/29 |
| 4,318,717 | A * | 3/1982 | Sohier | B01D 53/18 423/241 |
| 4,816,191 | A * | 3/1989 | Berven | B01D 53/18 261/97 |
| 5,224,351 | A * | 7/1993 | Jeannot | B01D 3/008 196/139 |
| 5,292,353 | A * | 3/1994 | Kaufman | B01D 47/024 96/337 |
| 5,648,048 | A | 7/1997 | Kuroda et al. | |
| 6,550,751 | B1 * | 4/2003 | Brown | B01D 53/185 96/326 |
| 9,776,125 | B2 * | 10/2017 | Strandberg | B01D 53/1493 |
| 10,981,109 | B2 * | 4/2021 | Haakansson | B01D 53/504 |
| 11,141,690 | B2 * | 10/2021 | Kruse Mortensen | B01D 53/18 |
| 2002/0158350 | A1 * | 10/2002 | Ender | B01D 3/008 261/97 |
| 2004/0194622 | A1 | 10/2004 | Kiss | |
| 2004/0255779 | A1 * | 12/2004 | Trivett | B01D 47/06 95/226 |
| 2006/0197239 | A1 * | 9/2006 | Kister | B01D 3/008 261/97 |
| 2008/0290532 | A1 | 11/2008 | Kooijman et al. | |
| 2010/0303676 | A1 | 12/2010 | Seeley et al. | |
| 2012/0280411 | A1 * | 11/2012 | Norton | B01D 3/008 261/74 |
| 2013/0269530 | A1 * | 10/2013 | Schulze | C10J 3/76 96/221 |
| 2014/0166110 | A1 * | 6/2014 | Nieuwoudt | F28F 25/04 261/23.1 |
| 2016/0016109 | A1 * | 1/2016 | Strandberg | B01D 53/1493 95/218 |
| 2016/0206970 | A1 * | 7/2016 | Alzner | B01D 3/008 |
| 2016/0332090 | A1 * | 11/2016 | Johannesen | B01D 3/20 |
| 2019/0344195 | A1 * | 11/2019 | Golden | B01D 3/14 |
| 2020/0030712 | A1 * | 1/2020 | Drumm | B01D 19/0036 |
| 2020/0179863 | A1 * | 6/2020 | Kruse Mortensen | B01D 47/06 |
| 2020/0206678 | A1 * | 7/2020 | Kruse Mortensen | B01D 53/185 |
| 2020/0215477 | A1 | 7/2020 | Kruse Mortensen | |

FOREIGN PATENT DOCUMENTS

| | | | |
|---|---|---|---|
| CN | 105597470 A | 5/2016 | |
| CN | 205730617 U | 11/2016 | |
| CN | 106369650 A | 2/2017 | |
| DE | 10118961 A1 | 10/2002 | |
| DE | 102011122014 A1 * | 6/2013 | ............ B01D 3/008 |
| DE | 102015105283 A1 | 8/2016 | |
| EP | 1448291 A2 | 8/2004 | |
| EP | 2 463 014 A1 | 6/2012 | |
| EP | 2775112 B1 | 10/2015 | |
| FR | 624071 A | 7/1927 | |
| GB | 1 509 157 A | 4/1978 | |
| JP | S50-060874 A | 5/1975 | |
| JP | S50-065968 A | 6/1975 | |
| JP | S53-124383 A | 10/1978 | |
| JP | 2005-510649 A | 4/2005 | |
| JP | 2016-514038 A | 5/2016 | |
| WO | 03045524 A2 | 6/2003 | |
| WO | WO-2012134470 A1 * | 10/2012 | ............ B01D 3/008 |
| WO | 2014/128261 A1 | 8/2014 | |
| WO | 2016158571 A1 | 10/2016 | |

OTHER PUBLICATIONS

Office Action issued Jul. 27, 2021, by State Intellectual Property Office of People's Republic of China in corresponding Chinese Patent Application No. 201880050469.2. (11 pages).
An English Translation of the Office Action (Notice of Reasons for Rejection) issued on Feb. 1, 2021, by the Japanese Patent Office in corresponding Japanese Patent Application No. 2020-505251. (5 pages).
International Search Report (PCT/ISA/210) mailed on Sep. 25, 2018, by the European Patent Office as the International Searching Authority for International Application No. PCT/EP2018/066199.
Written Opinion (PCT/ISA/237) mailed on Sep. 25, 2018, by the European Patent Office as the International Searching Authority for International Application No. PCT/EP2018/066199.
European Search Report and European Search Opinion issued by

(56) References Cited

OTHER PUBLICATIONS the European Patent Office on Jan. 8, 2018 in counterpart European Patent Application No. 17184158.8 (5 pages).

\* cited by examiner

SCRUBBER FOR CLEANING OF A GAS

TECHNICAL FIELD OF THE INVENTION

The present invention refers generally to the cleaning of gases, especially exhaust gases from engines, burners, boilers, etc., especially in marine vessels. More precisely, the present invention refers to a scrubber for cleaning of a gas, comprising
- a casing extending along a longitudinal central axis and enclosing a scrubbing chamber, wherein the casing has a gas inlet for the gas to be cleaned, which extends into the scrubbing chamber, and a gas outlet for the cleaned gas, which extends out from the scrubbing chamber, wherein the casing is configured to permit a gas flow of the gas to flow through the scrubbing chamber in a flow direction from the gas inlet to the gas outlet,
- a deflector device provided in the scrubbing chamber between the gas inlet and the gas outlet and forming a passage between the deflector device and the casing, and
- a spraying nozzle arranged between the gas outlet of the casing and the deflector device and configured to spray a scrubbing liquid into the scrubbing chamber and the gas flow.

BACKGROUND OF THE INVENTION AND PRIOR ART

US 2016/0016109 discloses a vertical scrubber for exhaust gas from a marine vessel engine. An exhaust gas tube is substantially coaxially arranged through the bottom of a lower scrubbing chamber. An exhaust gas outlet is coaxially arranged through the top of an upper scrubbing chamber. A lower scrubbing chamber deflection body is arranged above the opening of the exhaust gas tube for redirecting the exhaust gas towards the walls of the scrubber and for creating turbulent gas flow. Lower chamber water injectors are arranged above the lower scrubbing chamber deflection body to introduce scrubbing water. A lower chamber exhaust gas outlet is arranged at the top of the lower scrubbing chamber as a coaxial constriction for withdrawing the partly scrubbed exhaust gas from the first scrubbing chamber and introducing the gas into the upper scrubbing chamber.

When operating a scrubber, or wet scrubber, for cleaning an exhaust gas from, for instance, a marine vessel engine, scrubbing liquid is sprayed into the scrubbing chamber, which may comprise one or more scrubbing sections, to react with the exhaust gas for removing contaminants, such as sulfur, soot and particles. In the case of inline scrubbers, like the above described scrubber, in order to ensure that the scrubbing liquid does not flow into the exhaust gas line of the marine vessel engine, one or more deflector devices are provided in the scrubbing chamber. One such deflector device may typically be positioned above the exhaust gas pipe to function as a cover. In order to minimize the overall footprint of the scrubber, the available area for the exhaust gas to pass is limited, and thus the gas velocity may increase when passing the deflector device. The high gas velocity makes it difficult to drain the scrubbing liquid in the scrubber since the scrubbing liquid typically should pass the same area in the opposite direction, i.e. through the exhaust gas flow, to be drained. The effect may cause entrainment of scrubbing liquid to a higher level in the scrubber, either in the same scrubbing section or the next scrubbing section.

During operation of a scrubber with one stage, i.e. one scrubbing section, scrubbing liquid may be entrained to a higher, or more downstream, position in the scrubber because of the high exhaust gas velocity and reduced draining capabilities. The entrainment of scrubbing liquid may have several disadvantages during the operation of the scrubber. It may increase scrubbing liquid hold up in the scrubber. It may significantly increase the back pressure. It may decrease the capability to drain scrubbing liquid from the scrubbing chamber. It may increase the risk of sulfur release at a more downstream level in the scrubber caused by an increased quantity of scrubbing liquid that has absorbed sulfur. It may reduce the capability to ensure a counter flow in the scrubber, which decreases the overall scrubber performance.

During operation of a scrubber with two stages or more, i.e. with an upstream scrubbing section and a downstream scrubbing section, scrubbing liquid may be entrained from the upstream scrubbing section to the downstream scrubbing section by the high exhaust gas velocity and by reduced draining capabilities. Also in this case, the entrainment of scrubbing liquid may have several disadvantages during the operation of the scrubber. It may increase scrubbing liquid hold up in the upstream scrubbing section. It may significantly increase the back pressure. It may decrease the capability to drain scrubbing liquid from the upstream scrubbing section. It may "pollute" the scrubbing process and the scrubbing liquid in the downstream scrubbing section with soot and particles. It may decrease the possibility to make an overall scrubbing liquid cleaning as the amount of "polluted" scrubbing liquid may be much higher in the downstream section than in the upstream section. It may demand a higher draining capacity in the downstream scrubbing section. It may increase the risk of sulfur release in the downstream section caused by an increased quantity of scrubbing liquid that has absorbed sulfur. It may reduce the capability to use a reflux system for circulating drained scrubbing liquid from the downstream section to the upstream section as described in EP 2775112.

SUMMARY OF THE INVENTION

An object of the present invention is to overcome the problems discussed above. More precisely, an object of the present invention is to reduce the entrainment of scrubbing liquid in a scrubber.

This object is achieved by the scrubber initially defined, which is characterized in that the scrubber comprises an inner shield extending between the casing and the deflector device and, at least partly, surrounding the deflector device. The inner shield forms a gap with the casing, which gap has an inlet end and an outlet end to permit a downwards flow of scrubbing liquid through the gap, past the inner shield, along the casing.

Thus, the scrubber comprises an inner shield extending inside the casing and outside the deflector device. The inner shield separates a gap, between the inner shield and the casing, from the passage, which gap has an inlet end and an outlet end. The inner shield is configured to permit a flow of scrubbing liquid through the gap.

During operation of the scrubber, droplets of the scrubbing liquid will hit the deflector device. Scrubbing liquid will thus be collected on the deflector device. This scrubbing liquid should be drained from the scrubber, typically at a position upstream of the deflector device, i.e. between the gas inlet and the deflector device. Such drainage may necessitate a scrubbing liquid flow in a direction opposite to the gas flow direction in the casing. In the passage between the casing and the deflector device, especially at a most narrow portion of this passage, the flow velocity of the gas passing from the gas inlet to the gas outlet may be lower close to, or at, an inner side of the casing than at a distance from the inner side of the casing, i.e. closer to the deflector device. A high gas flow velocity may obstruct an opposite scrubbing liquid flow and thus scrubbing liquid drainage, and even force the scrubbing liquid in the gas flow direction.

The inner shield may protect or shield the scrubbing liquid flowing along the inner side of the casing from the gas that flows in the passage at a large velocity in the flow direction. The inner shield may prevent the gas from contacting the scrubbing liquid in the gap, and from entraining scrubbing liquid into the gas flow towards the gas outlet. The entrainment of scrubbing liquid from the passage may thus be reduced as well the scrubbing liquid hold-up and the back pressure.

According to an embodiment of the invention, the longitudinal central axis may be vertical or slightly inclined in relation to a vertical direction.

According to an embodiment of the invention, the gas inlet may be arranged below the gas outlet. The gas inlet and gas outlet may, or may not be, concentrically arranged.

According to an embodiment of the invention, the inlet end of the gap is open towards the gas outlet, and the outlet end of the gap is open towards the gas inlet, wherein the flow of scrubbing liquid is permitted from the inlet end to the outlet end in a direction opposite to the flow direction. The scrubbing liquid may thus flow in an undisturbed manner through the gap towards liquid outlet means in a direction opposite to the flow direction.

According to an embodiment of the invention, the inner shield extends around the deflector device to give the gap between the inner shield and the casing an annular extension. An annular extension is advantageous when a small footprint is required. Furthermore, a smooth flow through the scrubbing chamber may be ensured by the annular extension.

According to an embodiment of the invention, the casing and the inner shield have cross-sections of at least partly the same shape, but not necessarily the same size. Thus, the gap between the casing and the inner shield may have a uniform thickness in a cross sectional plane.

According to an embodiment of the invention, the inner shield comprises an inclined shield portion. The inclined shield portion is inclined inwardly towards the longitudinal central axis so as to gradually widen the gap in a direction from the outlet end towards the inlet end of the gap. This means that the gap will be tapered in the opposite direction. The inclined shield portion may define the inlet end of the gap or be an intermediate portion of the inner shield. The inclined shield portion may facilitate the entering and guidance of the scrubbing liquid into the gap.

According to an embodiment of the invention, the inner shield comprises an axial shield portion extending axially with the casing from the inclined shield portion towards the outlet end of the gap. The axial shield portion may thus extend in parallel with the casing.

According to an embodiment of the invention, the scrubber comprises a flow prevention element extending inwardly from the casing, perpendicular or not to the inner side of the casing, into the gap and arranged to force scrubbing liquid towards the inner shield. The flow prevention element may direct the scrubbing liquid flowing along the inner side of the casing to the inner shield, and thus ensure a flow of scrubbing liquid on an outer side of the inner shield, which outer side faces the gap. The gas flowing through the scrubbing chamber may be hot, or very hot, and the flow of scrubbing liquid on the outer side of the inner shield may ensure cooling of the inner shield. The flow prevention element may thus prevent droplets of scrubbing liquid on the outer side of the inner shield. Such droplets may evaporate instantly and leave deposits, such as salts, on the outer side of the inner shield, which deposits could result in a restriction of the gap, and eventually a blocking of the gap.

According to an embodiment of the invention, the scrubber comprises a flow prevention element extending inwardly from the casing, perpendicular or not to the inner side of the casing, into the gap and arranged to force scrubbing liquid towards the inner shield, which flow prevention element is provided opposite to the inclined shield portion. A flow of scrubbing liquid on the outer side of the inner shield may thus be ensured from the inlet end to the outlet end, i.e. along the whole axial length of the inner shield.

According to an embodiment of the invention, the flow prevention element extends to a position at a distance from the inner shield.

According to an embodiment of the invention, the inner shield, and thus the gap, has an axial length and a transversal length perpendicular to the axial length. The transversal length is thus perpendicular to the longitudinal central axis, and extends peripherally inside the casing. The flow prevention element may extend along a part of, or the whole, transversal length of the inner shield and of the gap.

According to an embodiment one of the invention, the deflector device comprises an upstream surface, which is turned towards the gas inlet and has an outer edge that coincides with an upstream transversal plane, and a downstream surface, which is turned towards the gas outlet and has an outer edge that coincides with a downstream transversal plane. The upstream and downstream transversal planes may be displaced in relation to each other or coincide. The upstream surface of the deflector device is the surface visible from the gas inlet and it may be formed by one and the same or more than one component. Similarly, the downstream surface of the deflector device is the surface visible from the gas outlet and it may be formed by one and the same or more than one component.

According to an embodiment of the invention, the upstream surface tapers towards the gas inlet. Such an upstream surface may guide the gas flowing through the scrubbing chamber outwardly to the passage. Since the passage may form a restriction of the flow area of the scrubbing chamber, the gas velocity at the passage will increase.

According to an embodiment of the invention, the outlet end of the gap is located axially closer to the gas inlet than the upstream transversal plane. Thus, the inner shield may be located at the level of the passage, where the gas velocity is relatively very high and the need for scrubbing liquid flow shielding is relatively large.

According to an embodiment of the invention, the inlet end of the gap is located axially closer to the gas outlet than the downstream transversal plane. Thus, the inner shield may be located at the level of the passage, where the gas velocity is relatively very high and the need for scrubbing liquid flow shielding is relatively large.

According to an embodiment of the invention, the spraying nozzle is located axially closer to the gas outlet than the inlet end of the gap. The spray angle of the spraying nozzle is typically between 60 and 180 degrees. Thus, this embodiment renders it possible for the scrubbing liquid sprayed from the spraying nozzle to enter the gap.

According to an embodiment of the invention, the scrubber comprises at least one conveying member extending from the deflector device and configured to guide scrubbing liquid from the deflector device to facilitate draining of scrubbing liquid from the scrubber. The at least one conveying member may extend towards liquid outlet means of the scrubber.

According to an embodiment of the invention, the scrubber comprises at least one conveying member extending from the deflector device towards the casing, wherein the at least one conveying member is configured to lead scrubbing liquid from the deflector device towards the casing, in particular to an inner side of the casing. Scrubbing liquid reaching the deflector device may thus be conveyed towards the casing, and in particular to the inner side of the casing to form a flow of scrubbing liquid to liquid outlet means, thereby further reducing the entrainment of scrubbing liquid by the gas flow.

According to an embodiment of the invention, the inner shield comprises at least one opening extending from an inside to an outside of the inner shield and communicating with the at least one conveying member to permit feed of scrubbing liquid from the deflector device to the gap. The conveying member, or conveying members, may thus convey the scrubbing liquid directly to the gap, excluding any contact between the gas and the scrubbing liquid.

According to an embodiment of the invention, the passage between the deflector device and the casing has a varying width and the inner shield extends through a most narrow portion of the passage. Thereby, an optimum position and extension of the inner shield is enabled since the gas velocity, and thus the need for scrubbing liquid shielding, typically is the largest at the most narrow portion of the passage.

According to an embodiment of the invention, the scrubber comprises a restriction element extending inwardly from the casing towards the gas outlet, wherein the restriction element forms a tray between the restriction element and the casing, and wherein the tray is configured to collect scrubbing liquid.

According to an embodiment of the invention, the restriction element is provided downstream the deflector device, and downstream the inner shield.

According to an embodiment of the invention, the scrubber comprises an upstream scrubbing section adjacent to the gas inlet inside which the above deflector device is arranged as an upstream deflector device, and a downstream scrubbing section adjacent to the gas outlet inside which a further deflector device is arranged as a downstream deflector device. The inner shield may be provided in the upstream scrubbing section at an axial level of the upstream deflector device.

BRIEF DESCRIPTION OF THE DRAWINGS

The present invention is now to be explained more closely through a description of various embodiments and with reference to the drawings attached hereto.

DETAILED DESCRIPTION OF VARIOUS EMBODIMENTS

Figure 1:
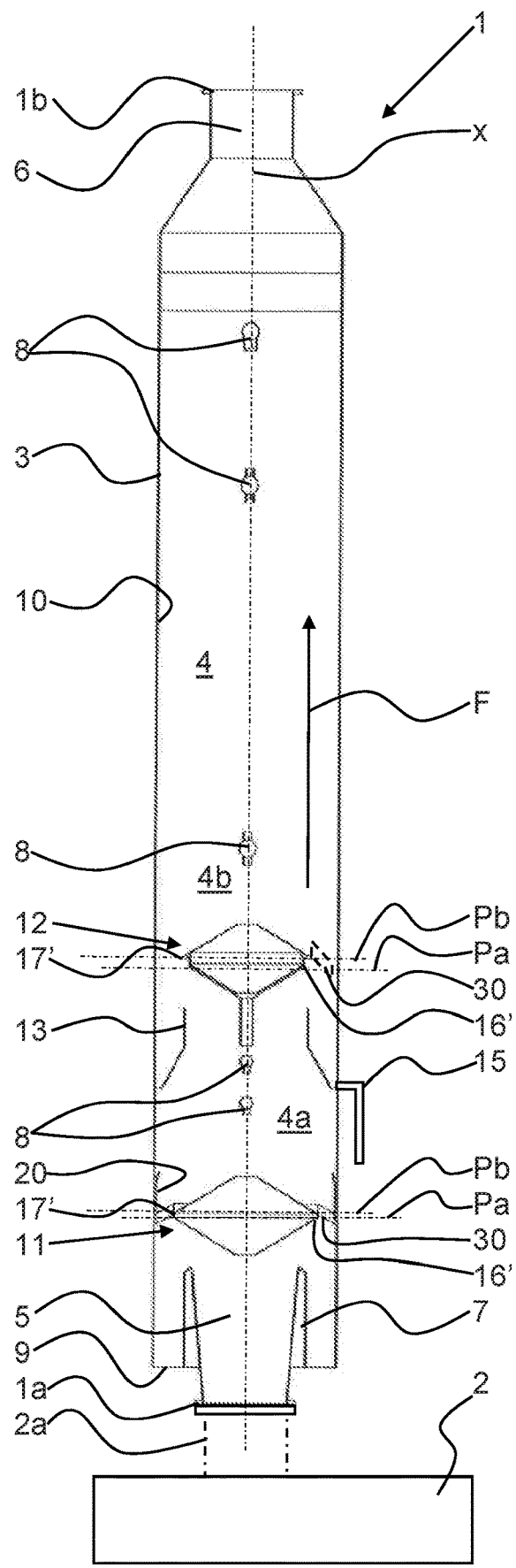
FIG. 1 discloses schematically a longitudinal section of a scrubber according to a first embodiment of the invention.

FIG. 1 discloses an inline scrubber 1 for cleaning of a gas, such as an exhaust gas from an engine, a burner a boiler, etc., for instance a marine vessel engine 2 schematically indicated in FIG. 1.

The scrubber 1 comprises a casing 3, which extends along a longitudinal central axis x, and encloses a scrubbing chamber 4. The longitudinal central axis x may be vertical as indicated in FIG. 1. The scrubber 1 has a first end 1a, that may form a lower end, and a second end 1b, that may form an upper end.

Figure 4:
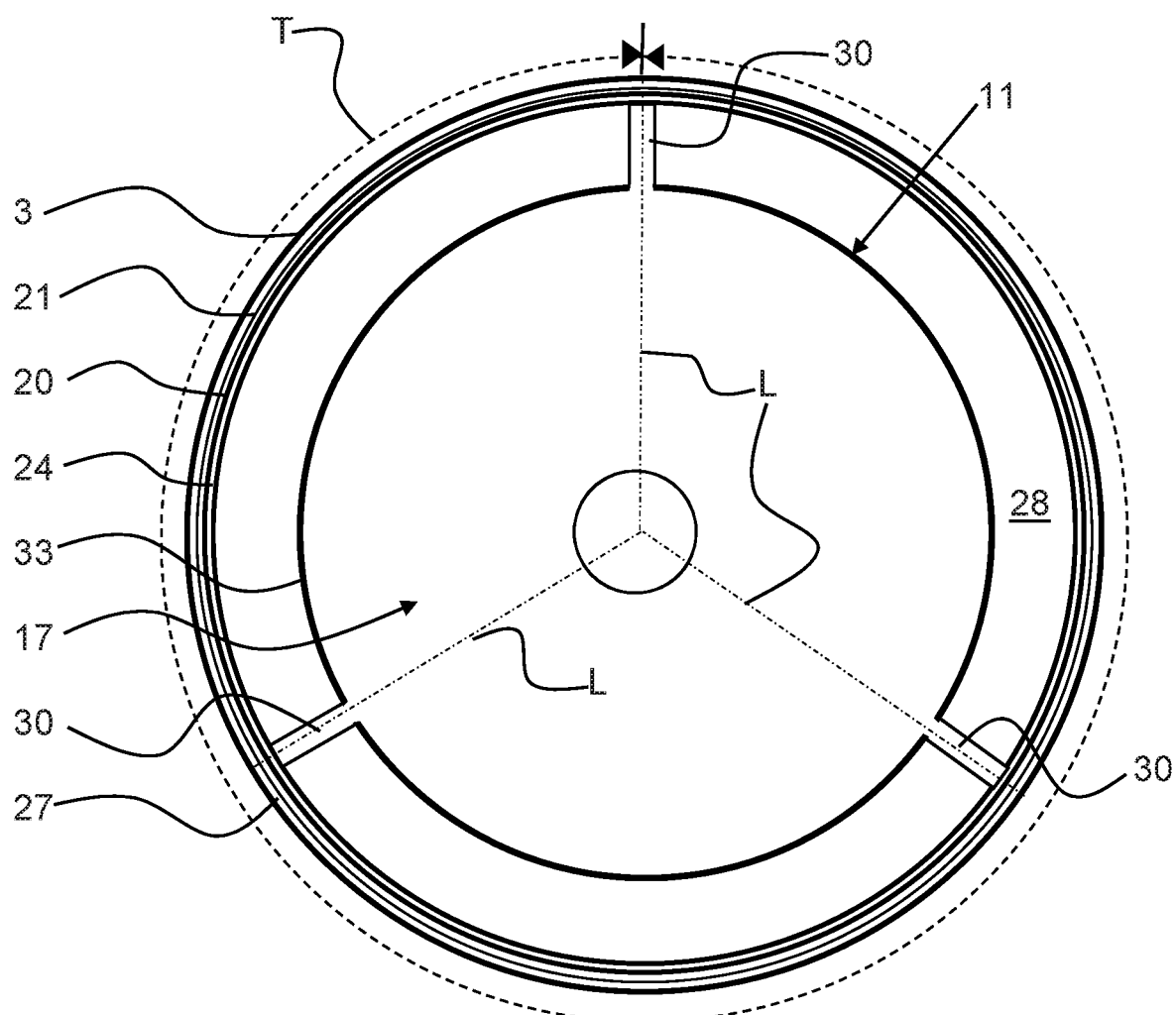
FIG. 4 discloses schematically a transversal section along the line IV-IV in FIG. 2.

In the first embodiment, the scrubber 1 and the casing 3 have a circular cross-section, see FIG. 4.

The casing 3 comprises a gas inlet 5 for the gas to be cleaned, and a gas outlet 6 for the cleaned gas. The gas inlet 5 is provided at the first end 1a and extends into the scrubbing chamber 4. The gas outlet 6 is provided at the second end 1b and extends out from the scrubbing chamber 4.

In the first embodiment, the gas inlet 5 and the gas outlet 6 are concentric with the longitudinal central axis x, see FIG. 1.

The casing 3 is configured to permit a gas flow of the gas to flow through the scrubbing chamber 4 in a flow direction F from the gas inlet 5 to the gas outlet 6.

The gas inlet 5 comprises an inlet tube 7 which is connected to an exhaust pipe 2a of the marine vessel engine 2. The inlet tube 7 extends into the scrubbing chamber 4 at the first end 1a, see also FIG. 2. The exhaust pipe 2a and the inlet tube 7 may extend in line with the longitudinal central axis x.

The scrubber 1 comprises at least one spraying nozzle 8 configured to spray a scrubbing liquid into the scrubbing chamber 4 and into the gas flow. In the embodiments disclosed, the scrubber 1 comprises a plurality of spraying nozzles 8, for instance five spraying nozzles 8, as indicated in FIG. 1. The number of spraying nozzles 8 may be adapted to the design and the size of the scrubber 1. Each spraying nozzle 8 may be directed towards the gas inlet 5 and/or towards the gas outlet 6, see the exemplified directions in FIG. 1.

Figure 2:
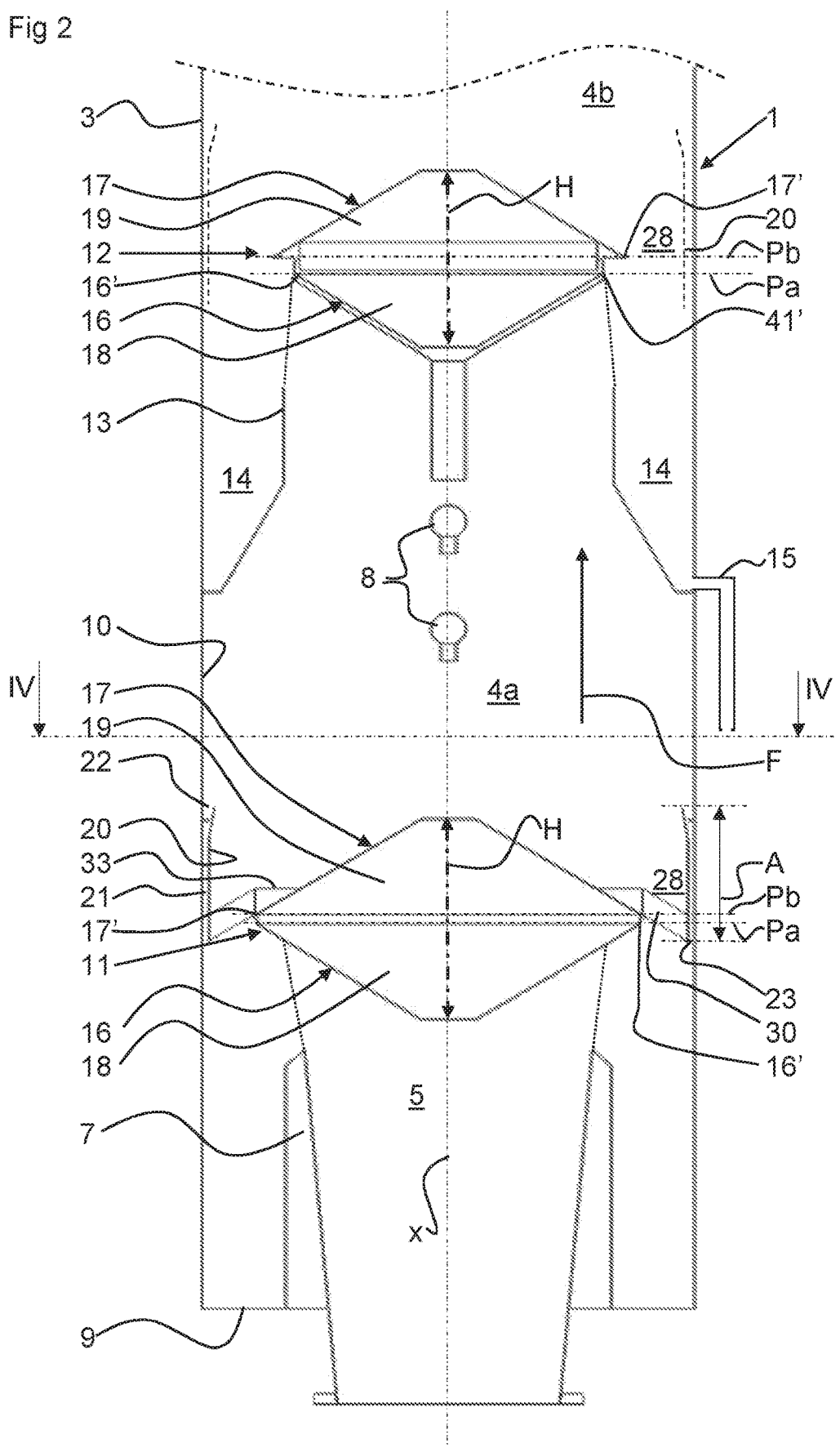
FIG. 2 discloses schematically a longitudinal section of a part of the scrubber in FIG. 1.

The scrubber 1 comprises liquid outlet means for discharging used scrubbing liquid from the scrubbing chamber 4. A first liquid outlet 9 of the liquid outlet means is provided outside the gas inlet 5. In the first embodiment, the first liquid outlet 9 may be annular and extend around the inlet tube 7 between an inner side 10 of the casing 3 and the inlet tube 7, as can be seen in FIGS. 1 and 2. Used scrubbing liquid, flowing along the inner side 10 of the casing 3, may be discharged via the first liquid outlet 9.

The scrubber 1 comprises at least one deflector device 11, 12 provided in the scrubbing chamber 4, concentrically with the casing 3, between the gas inlet 5 and the gas outlet 6. In the first embodiment, two deflector devices 11, 12 are provided, one upstream deflector device 11 and one downstream deflector device 12.

The spraying nozzles 8 are arranged between the gas outlet 6 of the casing 3 and the upstream deflector device 11.

The upstream deflector device 11 may be provided close to the gas inlet 5 and function as a cover preventing scrubbing liquid from entering the gas inlet 5 and the exhaust pipe 2a of the marine vessel engine 2. This can be seen in FIGS. 1 and 2, where the upstream deflector device 11 is provided just above the inlet tube 7.

The upstream deflector device 11 may be attached to the inlet tube 7 via suitable attachment bars, schematically indicated by dotted lines in FIG. 2.

The scrubber 1 may comprise a restriction element 13 extending inwardly from the casing 3 towards the gas outlet 6. The restriction element 13 forms an annular tray 14 between the restriction element 13 and the inner side 10 of the casing 3. The tray 14 is configured to collect used scrubbing liquid. A second liquid outlet 15 of the liquid outlet means extends from the tray 14 out from the casing 3 and permits discharge of used scrubbing liquid from the scrubbing chamber 4.

The restriction element 13 is provided downstream the upstream deflector device 11 and upstream the downstream deflector device 12, or in other words axially between the upstream deflector device 11 and the downstream deflector device 12.

The downstream deflector device 12 may be attached to the restriction element 13 via suitable attachment bars, schematically indicated by dotted lines in FIG. 2. Alternatively, the downstream deflector device 12 could be attached to the casing 3.

In the first embodiment, the scrubber 1 is a two-stage scrubber and comprises an upstream scrubbing section 4a adjacent to the gas inlet 5 and a downstream scrubbing section 4b adjacent to the gas outlet 6. The upstream deflector device 11 is provided in the upstream scrubbing section 4a. The downstream deflector device 12 is provided in the downstream scrubbing section 4b.

The restriction element 13 may form a transition from the upstream scrubbing section 4a to the downstream scrubbing section 4b.

The upstream deflector device 11 and the downstream deflector device 12 comprise a respective upstream deflector 18 having an upstream surface 16, see FIG. 2. The upstream surface 16 may cover the upstream deflector 18. The upstream surface 16 has an outer edge 16', which also may form the outer edge 16' of the upstream deflector 18. The upstream surface 16 extends from a respective upstream transversal plane Pa of the upstream and downstream deflector devices 11, 12 towards the gas inlet 5, see FIGS. 1 to 3. The upstream surface 16 tapers from the outer edge 16' located at the upstream transversal plane Pa towards the gas inlet 5. In the first embodiment, the upstream surface 16 may be shaped as a cone or a truncated cone.

The upstream deflector device 11 and the downstream deflector device 12 also comprise a respective downstream deflector 19 having a downstream surface 17. The downstream surface 17 may cover the downstream deflector 19. The downstream surface 17 has an outer edge 17', which also may form the outer edge 17' of the downstream deflector 19. The downstream surface 17 extends from a respective downstream transversal plane Pb of the upstream and downstream deflector devices 11, 12 towards the gas outlet 6, see FIGS. 1 to 3. The downstream surface 17 tapers from the outer edge 17' located at the downstream transversal plane Pb towards the gas outlet 6. In the first embodiment, the downstream surface 17 may be shaped as a cone or a truncated cone.

The transversal planes Pa, Pb are perpendicular to the longitudinal central axis x.

In the first embodiment, both the upstream deflector device 11 and the downstream deflector device 12 have a circular shape, when seen in the direction of the longitudinal central axis x, and form a respective annular passage 28 between the deflector device 11, 12 and the casing 3, see FIG. 4.

The scrubbing chamber 4 has a smaller flow area at the passage 28 than upstream and downstream the passage 28.

The diameter of the downstream deflector device 12 may, but does not have to, be smaller than the diameter of the upstream deflector device 11 as is indicated in FIG. 2.

The Inner Shield 20

The scrubber 1 comprises an inner shield 20 extending inside the casing 3 and outside the upstream deflector device 11, i.e. between the casing 3 and the deflector device 11. The inner shield 20 is fastened to the casing 3 by screws or welding and extends along the inner side 10 of, and concentrically with, the casing 3. The inner shield 20 separates a gap 21, between the inner shield 20 and the inner side 10 of the casing 3, from the passage 28, see also FIG. 3.

Due to the conical shape of the upstream and downstream surfaces 16, 17 of the deflector device 11, the passage 28 between the deflector device 11 and the casing 3 has a varying width and the inner shield 20 extends through a most narrow portion of the passage 28. In the first embodiment, the most narrow portion of the passage 28 is located at the downstream transversal plane Pb and/or at the upstream transversal plane Pa.

The gap 21 has an inlet end 22, which is open towards the gas outlet 6, and an outlet end 23, which is open towards the gas inlet 5. The inner shield 20 enables a flow of scrubbing liquid through the gap 21 from the inlet end 22 to the outlet end 23 along the inner side 10 of the casing 3 in a direction opposite to the flow direction F.

The inner shield 20 extends around the upstream deflector device 11 to give the gap 21 between the inner shield 20 and the casing 3 an annular extension.

The casing 3 and the inner shield 20 have at least partly uniform cross sections. In the first embodiment, the casing 3 and the inner shield 20 both have a circular cross section.

The passage 28 has a transversal extension perpendicular to the longitudinal central axis x. The inner shield 20 adjoins the passage 28 along the whole transversal extension of the passage 28. The transversal extension of the passage 28 is perpendicular to the longitudinal central axis x, and extends peripherally inside the casing 3 and the inner shield 20. In the first embodiment, the transversal extension is 360 degrees around the upstream deflector device 11.

The inner shield 20 is formed of a sheet material, such as a metal sheet, and comprises an inclined, here conical, shield portion 24. The inclined shield portion 24 is inclined inwardly towards the longitudinal central axis x so as to gradually widen the gap 21 in a direction from the outlet end 23 towards the inlet end 22 of the gap 21.

The inclined shield portion 24 extends from a plane 25, which extends perpendicularly to the longitudinal central axis x and is located between the outlet and inlet ends 23, 22 of the gap 21, towards, here all the way to, the inlet end 22.

The plane 25 may be located more closely to the inlet end 22 than to the outlet end 23. Alternatively, the plane 25 may be located more closely to the outlet end 23 than to the inlet end 22, or even at the outlet end 23.

In the first embodiment, the inner shield 20 also comprises a straight or axial shield portion 29 extending axially with the casing 3 from the inclined shield portion 24 towards the outlet end 23. The axial shield portion 29 extends, from the plane 25, in parallel with longitudinal central axis x and in parallel with the casing 3.

In the first embodiment, the inner shield 20 has a circular cross section, and thus the gap 21 between the casing 3 and the inner shield 20 is annular as can be seen in FIG. 4 and as is mentioned above. The inner shield 20 has an axial length A, see FIG. 2, along the casing 3, and a transversal length T perpendicular to the axial length A. In the first embodiment, the transversal length T of the inner shield 20 is equal to the circumferential length of the inner shield 20 see FIG. 4.

The upstream and downstream deflector devices 11, 12 have a respective height H, which coincides with the longitudinal central axis x and extends from the upstream surface 16 to the downstream surface 17, see FIG. 2. The height H of the upstream deflector device 11 may differ from the height H of the downstream deflector device 12. The axial length A of the inner shield 20 may be less than two times the height H of the upstream deflector device 11.

Figure 3:
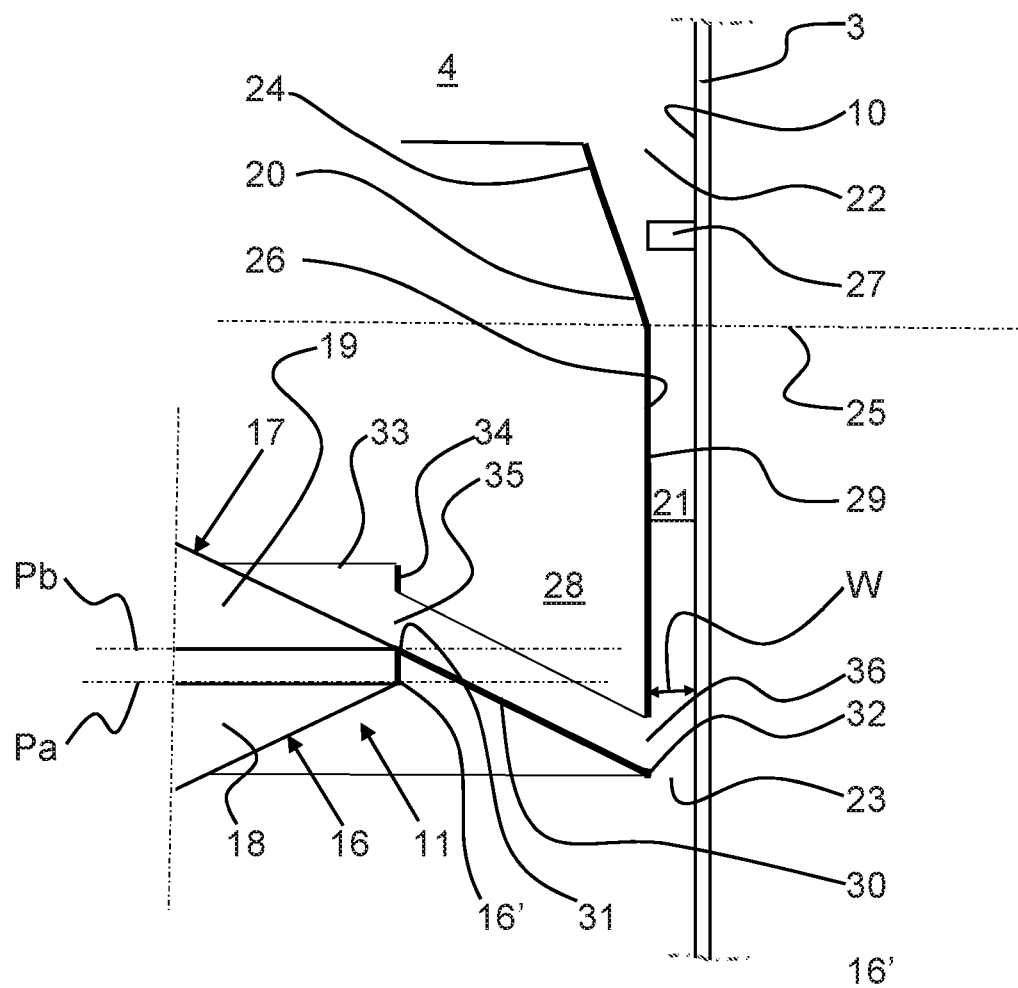
FIG. 3 discloses schematically a longitudinal section of an inner shield of the scrubber in FIG. 1.

The gap 21 has a width W, i.e. a distance from the inner side 10 of the casing 3 to an outer side 26 of the inner shield 20, which is varying, see FIG. 3. The width W may be 2-8 mm, preferably 3-5 mm, more preferably 4 mm or approximately 4 mm, at or below the plane 25, i.e. outside the inclined shield portion.

The scrubber 1 comprises a flow prevention element 27 extending inwardly from, and welded to the inner side 10 of, the casing 3 into the gap 21. The flow prevention element 27 is arranged to force scrubbing liquid towards the inner shield 20. As can be seen in FIG. 3, the flow prevention element 27 is provided opposite to the inclined shield portion 24, and extends towards the inclined shield portion 24 to a position at a distance from the inner shield 20 and from the inclined shield portion 24. The flow prevention element 27 may extend along the whole transversal length T of the inner shield 20, i.e. in the first embodiment along the circumference of the inner shield 20.

The inner shield 20 is thus provided in the upstream scrubbing section 4a at an axial level of the upstream deflector device 11. More precisely, the outlet end 23 of the gap 21 is located axially closer to the gas inlet 5 than the upstream transversal plane Pa. Furthermore, the inlet end 22 of the gap 21 is located axially closer to the gas outlet 6 than the downstream transversal plane Pb.

Each of the spraying nozzles 8 is located axially closer to the gas outlet 6 than the inlet end 22 of the gap 21. In particular, the most upstream spraying nozzle 8 is located axially closer to the gas outlet 6 than the inlet end 22 of the gap 21.

The Conveying Members 30

In the first embodiment, the scrubber 1 comprises at least one conveying member 30 extending from the upstream deflector device 11 towards the casing 3. The number of conveying members 30 may be one, two, three, four or even more. In the first embodiment, three conveying members 30 are provided, see FIG. 4. The three conveying members 30 may be equidistantly provided around the upstream deflector device 11.

The conveying members 30 are configured to lead scrubbing liquid collected by the upstream deflector device 11 from the upstream deflector device 11 towards the casing 3.

Each of the conveying members 30 extends along a portion of an imaginary straight line L. In the first embodiment the imaginary straight line L extends from the longitudinal central axis x to the casing 3, see FIG. 4. In the first embodiment, each conveying member 30 thus extends radially outwardly with respect to the longitudinal central axis x. It should be noted that the imaginary straight line L may extend from any position at the downstream surface 17, and thus have a tangential component.

The conveying members 30 extend through the passage 28 and towards the first end 1a, from a start position 31 to an end position 32, see FIG. 3.

The start position 31 is located at the outer edge 17' of the downstream surface 17 of the upstream deflector device 11. The end position 32 is located at, or adjacent to, the inner side 10 of the casing 3.

The end position 32 is located more closely to the gas inlet 5 than the start position 31. The end position 32 is also located more closely to the gas inlet 5 than the upstream and downstream transversal planes Pa and Pb of the upstream deflector device 11. The conveying members 30 will thus slope from the outer edge 17' towards the gas inlet 5. Further, the end position 32 will thus be located below the most narrow portion of the passage 28.

As can be seen in FIGS. 2 and 4, the conveying members 30 thus extend from the downstream surface 17, and more precisely from the outer edge 17' of the downstream surface 17 of the deflector device 11. Consequently, the scrubbing liquid may be collected on the downstream surface 17 and conveyed via the conveying members 30 towards the inner side 10 of the casing 3 to form a flow of scrubbing liquid on the inner side 10 of the casing 3.

The scrubber 1 further comprises an edge member 33 extending around the downstream surface 17, in particular along the outer edge 17' of the upstream deflector device 11. In the first embodiment, the edge member 33 is annular to enclose, or at least partly enclose, the downstream surface 17 of the deflector device 11.

The edge member 33 forms a wall 34 extending from the outer edge 17' of the downstream surface 17, and away from the downstream transversal plane Pb, towards the gas outlet 6 in parallel with the longitudinal central axis x.

Scrubbing liquid collected on the downstream surface 17 of the upstream deflector device 11 may thus be retained on the downstream surface 17 by the edge member 33.

The edge member 33 comprises openings 35 extending from an inside to an outside of the edge member 33 and communicating with a respective one of the conveying members 30. The openings 35 thus permit the scrubbing liquid collected on the downstream surface 17 to escape via the conveying members 30, see FIG. 3.

In the first embodiment, each of the conveying members 30 is configured as a tray that is open towards the gas outlet 6, see FIG. 3.

In the first embodiment, the inner shield 20 comprises openings 36 extending from an inside to an outside of the inner shield 20 and communicating with a respective one of the conveying members 30 to permit feed of scrubbing liquid from the deflector device 11 to the gap 21, see FIG. 3. In the first embodiment, the openings 36 are located at the axial level of the outlet end 23 of the gap 21, which means that the openings 36 are formed as notches in an upstream edge of the inner shield 20. The conveying members 30 may thus convey scrubbing liquid from the downstream surface 17 of the upstream deflector device 11 to the gap 21, as can be seen in FIG. 3.

Further Embodiments

Figure 5:
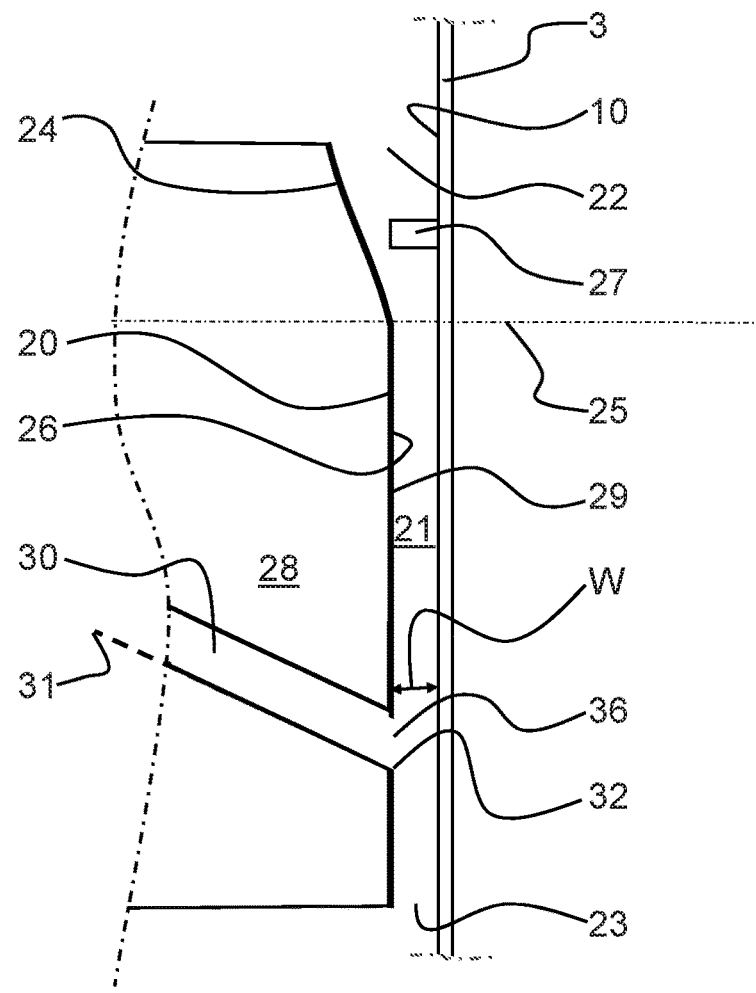
FIG. 5 discloses schematically a longitudinal section of the inner shield of a scrubber similar to FIG. 3 but according to a second embodiment.

FIG. 5 refers to a second embodiment that differs from the first embodiment in that the conveying members 30 are configured as pipes.

Furthermore, the conveying members 30 of the second embodiment extend to the end position 32 at an axial distance from the outlet end 23 of the gap 21. That means that the inner shield 20 may extend further from the end position 32 of the conveying member 30 towards the first end 1a. Furthermore, the axial distance between the outlet end 23 of the gap 21 and the upstream transversal plane Pa may be longer than in the first embodiment.

Figure 6:
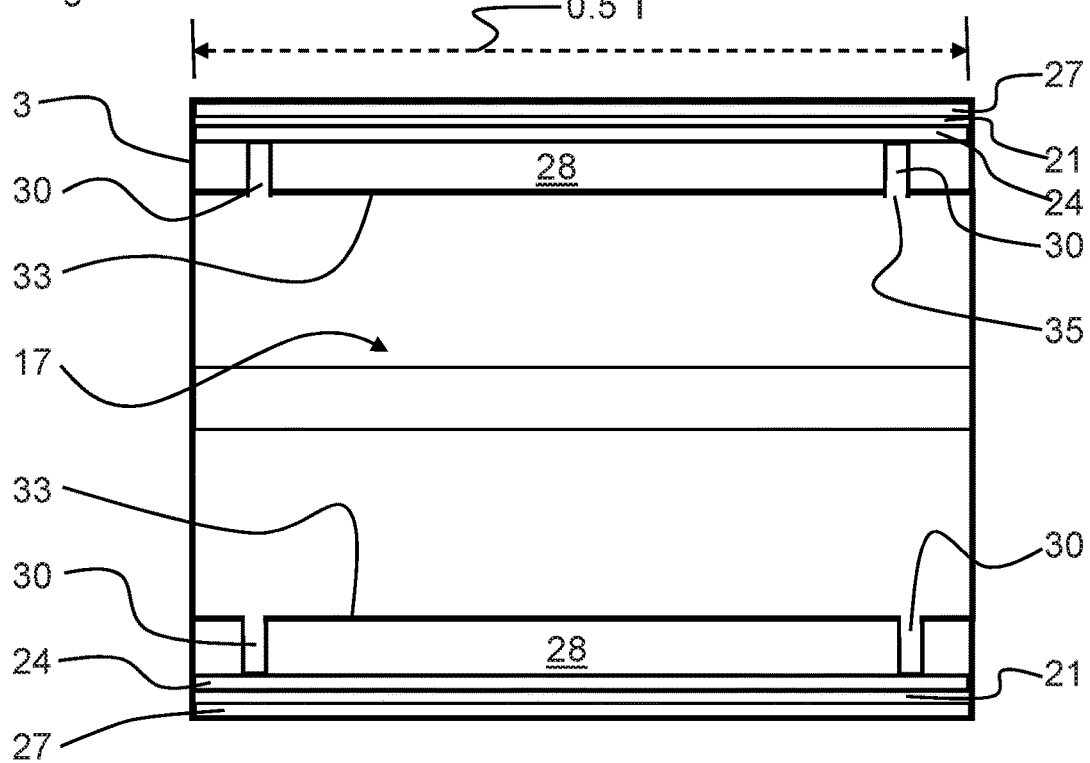
FIG. 6 discloses schematically a transversal section similar to the one in FIG. 4, of an upstream deflector device according to a third embodiment.

FIG. 6 refers to a third embodiment that differs from the first embodiment in that the casing 3 has a cross-sectional shape that is rectangular, in particular square. The deflector surfaces 16, 17 may then have a roof-like shape, each with two plane surface areas that are inclined and form an angle with each other. The longitudinal section of FIGS. 1 and 2 may illustrate also these two surface areas. Two inner shields 20, gaps 21, flow prevention elements 27, pairs of conveying members 30 and edge members 33 are provided opposite each other and extend in parallel with each other along a respective straight wall portion of the casing 3. The transversal length T of the inner shield 20 is the sum of the transversal length of the two opposite inner shields 20.

According to a variant of the third embodiment, the deflector surfaces 16, 17 may have a pyramid-like shape, wherein the passage 28 is formed by four orthogonal passages that surround the respective deflector device 11, 12. Each such passage may comprise an inner shield 20, a gap 21, a flow prevention element 27, a conveying member 30 and an edge member 33.

It should be noted that the scrubber 1 may be a one-stage scrubber and so comprise only one scrubbing section 4a, 4b with only one deflector device 11, 12. The single deflector device 11, 12, the conveying members 30 and the edge member 33 may then be arranged inside the inner shield 20, and the gap width W may be around 4-20 mm.

As is indicated with dashed lines in FIG. 2, a further inner shield 20 may also be provided outside the downstream deflector device 12 with a larger gap width W, due to a typically higher flow of scrubbing liquid in the scrubbing section 4b than in the scrubbing section 4a, of around 6-16 mm. Conveying members 30 may be provided from the downstream surface 17 of the downstream deflector device 12 to a position at the inner side 10 of the casing 3, in particular to a gap 21 formed by the further inner shield 20.

As is indicated with dashed lines in FIG. 1, at least one, for instance three, conveying members 30 may be provided from the downstream surface 17 of the downstream deflector device 12 to a position at the inner side 10 of the casing 3. The end position 32 of these conveying members 30 may be adjacent to the inner side 10 of the casing 3, where the velocity of the gas flow is lower than at a greater distance from the inner side 10. In FIG. 1, no inner shield 20 is provided at the downstream deflector device 12.

Operation of the Scrubber 1

When operating the scrubber 1, exhaust gas is introduced from the marine vessel engine 2 via the gas inlet 5. The exhaust gas, that has a high temperature, is guided in the upstream scrubbing section 4a towards the upstream surface 16 of the upstream deflector device 11, where it is forced radially outwardly towards the passage 28. Due to the varying width of and in particular the decreased flow area at the passage 28, the velocity of the gas flow through the passage 28 is increased and is the largest at the most narrow portion of the passage 28.

Scrubbing liquid is introduced into the gas flow via the spraying nozzles 8 to react with sulfur, soot and particles in the exhaust gas. The scrubbing liquid will absorb the sulfur, soot and particles, and form droplets.

A part of the droplets are forced towards the inner side 10 of the casing 3. These droplets may then form a flow of liquid flowing towards the first liquid outlet 9 by means for the gravity force in a direction opposite to the flow direction F of the gas flow. The inner shield 20 locally shields the flow of liquid from the gas flow to prevent that the liquid is forced upwards by the gas flow as the liquid flows in the gap 21 outside the inner shield 20. Thereby, draining of scrubbing liquid is facilitated.

Another part of the droplets are flowing towards the downstream surface 17 of the upstream deflector device 11 in the middle of the upstream scrubbing section 4a, where the velocity of the gas flow is lower than in a more outward area. The droplets hitting the downstream surface 17 of the upstream deflector device 11 form a liquid flowing on the downstream surface 17 towards the outer edge 17' and the edge member 33 by means of the gravity force. From there, the liquid is conveyed via the conveying members 30 towards the inner side 10 of the casing 3 and in particular to the gap 21. From the gap 21, the liquid from the conveying members 30 is drained, by gravity, through the first liquid outlet 9 together with the liquid already flowing along the inner side 10 of the casing 3.

The flow area of the gas flow is reduced at the restriction element 13 resulting in an increase of the velocity of the gas flow when entering the downstream scrubbing section 4b. The exhaust gas from the upstream scrubbing section 4a is forced outwardly to the passage 28 between the downstream deflector device 12 and the inner side 10 of the casing 3, where the decreased flow area results in a further increased velocity of the gas flow in the same way as at the upstream deflector device 11.

A part of the droplets entrained in the gas flow from the upstream scrubbing section 4a and formed in the downstream scrubbing section 4b, hit the inner side 10 of the downstream scrubbing section 4b and form a liquid flowing downwardly to the tray 14 and the second liquid outlet 15 for drainage. Another part of these droplets hit the downstream surface 17 of the downstream deflector device 12 and form liquid flowing downwardly on the downstream surface 17 to the tray 14 and the second liquid outlet 15 for drainage.

The present invention is not limited to the embodiments disclosed but may be varied and modified and combined within the scope of the following claims.

For example, the scrubber 1 may comprise further spraying nozzles 8, also below the upstream deflector device 11, for example spraying nozzles for cooling the exhaust gas arranged outside the gas inlet 5.

The casing 3, the inner shield 20, the deflector devices 11, 12 and the edge member 30 of the scrubber 1 according to the first embodiment are concentrically arranged and have uniform, circular cross sections. According to alternative embodiments, the casing 3, the inner shield 20, the deflector devices 11, 12 and/or the edge member 33 may be non-concentrically arranged and/or have other, such as oval, and/or different, cross sections. Further, the inner shield 20 need not extend all the way, but could extend only partially, around the deflector devices 11, 12.

The deflector devices 11, 12 of the first embodiment comprise conical upstream and downstream surfaces 16, 17.

Of course, alternative designs of the deflector devices 11, 12 are possible. For example, the deflector devices 11, 12 could instead comprise a plane upstream surface and/or a plane downstream surface.

The flow prevention element 27 of the first embodiment is a block element welded to the casing 3 and extends, as a single, annular component, all the way along the inner shield 20. Naturally, other designs are possible. For example, the flow prevention element 27 could be formed as a thin plate or as an integral part of the casing 3 and/or it could comprise a plurality of sub elements evenly distributed along the inner shield 20.

The start position 31 and the end position 32 of the conveying members 30 need not be arranged as described above. For example, the start position could be arranged on the downstream surface 17 of the upstream deflector device 11 at a distance from the outer edge 17' and/or the conveying members 30 could extend through the upstream deflector device 11. In such an embodiment, the downstream surface 17 could be plane. The start position 31 could even be arranged on the upstream surface 16 of the upstream deflector device 11. Further, the end position 32 could be arranged aligned with the start position 31 in relation to the longitudinal central axis (x).

It should be stressed that a description of details not relevant to the present invention has been omitted and that the figures are just schematic and not drawn according to scale. It should also be said that some of the figures have been more simplified than others. Therefore, some components may be illustrated in one figure but left out in another figure. Furthermore, it should be stressed that expressions like "upper", "lower", "vertical", "horizontal", "longitudinal" etc., which have been chosen to describe and reflect the scrubber when this is in its normal state of operation, are used herein just to distinguish between different details of the scrubber. Thus, these expressions are in no way limiting.

The invention claimed is:

1. A scrubber for cleaning of a gas, comprising
   a casing extending along a longitudinal central axis and enclosing a scrubbing chamber, wherein the casing has a gas inlet for the gas to be cleaned, which extends into the scrubbing chamber, and a gas outlet for the gas that has been cleaned, which extends out from the scrubbing chamber, wherein the casing is configured to permit a gas flow of the gas to flow through the scrubbing chamber in a flow direction from the gas inlet to the gas outlet, the casing including an inner side facing inwardly in a direction toward the scrubbing chamber,
   a deflector device provided in the scrubbing chamber between the gas inlet and the gas outlet, with a passage being located between an outer periphery of the deflector device and an inner side of the casing, the deflector device having a downstream surface facing towards the gas outlet, the longitudinal central axis of the casing passing through the downstream surface of the deflector device,
   a spraying nozzle arranged between the gas outlet of the casing and the downstream surface of the deflector device and configured to spray a scrubbing liquid into the scrubbing chamber and the gas flow so that one part of scrubbing liquid sprayed by the spraying nozzle contacts the downstream surface of the deflector device,
   an inner shield that is different from the deflector device, the inner shield including an inner side and an oppositely located outer side, the inner shield extending between the casing and the deflector device and, at least partly, surrounding the deflector device, the outer side of the inner shield facing towards and being spaced from the inner side of the casing so that a gap exists between the outer side of the inner shield and the inner side of the casing, which gap has an inlet end and an outlet end to permit a downwards flow of another part of the scrubbing liquid sprayed by the spraying nozzle, different from the one part of the scrubbing liquid, through the gap, past the inner shield, along the casing, and
   the inlet end of the gap is open towards the gas outlet, and the outlet end of the gap is open towards the gas inlet, and wherein the flow of the scrubbing liquid is permitted from the inlet end to the outlet end in a direction opposite to the flow direction.

2. The scrubber according to claim 1, wherein the inner shield extends around the deflector device to give the gap between the inner shield and the casing an annular extension.

3. The scrubber according to claim 1, wherein the casing and the inner shield cross sections are at least partly the same shape.

4. The scrubber according to claim 1, wherein the inner shield comprises an inclined shield portion which is inclined inwardly towards the longitudinal central axis so as to gradually widen the gap in a direction from the outlet end towards the inlet end of the gap.

5. The scrubber according to claim 4, wherein the inner shield comprises an axial shield portion extending axially with the casing from the inclined shield portion towards the outlet end of the gap.

6. The scrubber according to claim 4, wherein the scrubber comprises a flow prevention element fixed to the casing and extending inwardly from the casing into the gap and arranged to force scrubbing liquid towards the inner shield, which flow prevention element is provided opposite to the inclined shield portion, the flow prevention element being completely spaced apart from the inner shield.

7. The scrubber according to claim 1, wherein the scrubber comprises a flow prevention element fixed to the casing and extending inwardly from the casing into the gap, and arranged to force scrubbing liquid towards the inner shield, the flow prevention element being completely spaced apart from the inner shield.

8. The scrubber according to claim 1, wherein the deflector device comprises
   an upstream surface, which is turned towards the gas inlet and has an outer edge that coincides with an upstream transversal plane, and
   the downstream surface of the deflector device is turned towards the gas outlet and has an outer edge that coincides with a downstream transversal plane.

9. The scrubber according to claim 8, wherein the outlet end of the gap is located axially closer to the gas inlet than the upstream transversal plane.

10. The scrubber according to claim 8, wherein the inlet end of the gap is located axially closer to the gas outlet than the downstream transversal plane.

11. The scrubber according to claim 8, wherein the spraying nozzle is located axially closer to the gas outlet than the inlet end of the gap.

12. The scrubber according to claim 1, wherein the deflector device possesses an outer periphery, and further comprising at least one conveying member extending away from the outer periphery of the deflector device towards the casing, and wherein the at least one conveying member is configured to lead scrubbing liquid from the deflector device towards the casing, the at least one conveying member extending from only a portion of a circumferential extent of the deflector device.

13. The scrubber according to claim 12, wherein the inner shield comprises at least one opening extending from an inside to an outside of the inner shield and communicating with the at least one conveying member to permit feed of scrubbing liquid from the deflector device to the gap.

14. The scrubber according to claim 1, wherein the passage between the deflector device and the casing has a varying width and the inner shield extends through a most narrow portion of the passage.

15. The scrubber according to claim 1, wherein the deflector device possesses an outer periphery, and further comprising a tray projecting outwardly from the outer periphery of the deflector device to lead scrubbing liquid from the deflector device towards the casing, the tray extending from only a portion of a circumferential extent of the deflector device.

16. The scrubber according to claim 1, wherein the deflector device possesses an outer periphery, and further comprising a plurality of circumferentially spaced apart trays projecting outwardly from the outer periphery of the deflector device to lead scrubbing liquid from the deflector device towards the casing.

17. The scrubber according to claim 1, wherein the casing has an opening at a bottom end of the casing that is a liquid outlet so that the another part of the scrubbing liquid flowing downward through the gap, past the inner shield and along the casing is drained out of the casing by way of the liquid outlet.

18. The scrubber according to claim 1, wherein the gas inlet includes an inlet tube that is at a bottom end of the casing and that projects into the scrubbing chamber, the bottom end of the casing also having an opening surrounding the inlet tube at the bottom of the casing, the opening being a liquid outlet that allows the another part of the scrubbing liquid flowing downward through the gap, past the inner shield and along the casing to be drained out of the casing by way of the liquid outlet.

* * * * *